United States Patent
Keum et al.

(10) Patent No.: US 12,022,019 B2
(45) Date of Patent: Jun. 25, 2024

(54) METHOD AND ELECTRONIC DEVICE FOR ADJUSTING OUTPUT LEVEL OF SPEAKER ON BASIS OF DISTANCE FROM EXTERNAL ELECTRONIC DEVICE

(71) Applicant: Samsung Electronics Co., Ltd., Suwon-si (KR)

(72) Inventors: Jongmo Keum, Suwon-si (KR); Jungyeol An, Suwon-si (KR); Gangyoul Kim, Suwon-si (KR); Hyunwook Kim, Suwon-si (KR); Hyungmo Moon, Suwon-si (KR); Seungyoon Heo, Suwon-si (KR); Jaemo Yang, Suwon-si (KR); Yangsu Kim, Suwon-si (KR); Vadim Kudryavtsev, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 646 days.

(21) Appl. No.: 17/250,604

(22) PCT Filed: May 29, 2019

(86) PCT No.: PCT/KR2019/006440
§ 371 (c)(1),
(2) Date: Feb. 9, 2021

(87) PCT Pub. No.: WO2020/032363
PCT Pub. Date: Feb. 13, 2020

(65) Prior Publication Data
US 2021/0297518 A1 Sep. 23, 2021

(30) Foreign Application Priority Data
Aug. 9, 2018 (KR) .......................... 10-2018-0092905

(51) Int. Cl.
H04M 9/08 (2006.01)
H04M 1/60 (2006.01)
H04R 3/02 (2006.01)

(52) U.S. Cl.
CPC .............. *H04M 1/605* (2013.01); *H04R 3/02* (2013.01)

(58) Field of Classification Search
CPC ..... H04R 3/02; H04R 2430/01; H04M 1/605; H04M 1/72454; H04M 9/085; H04W 4/06
(Continued)

(56) References Cited

U.S. PATENT DOCUMENTS 5,742,745 A 4/1998 Sugikawa et al.
9,124,348 B2 9/2015 Kimura et al.
(Continued)

FOREIGN PATENT DOCUMENTS

JP 3326292 B2 9/2002
JP 2017-163509 A 9/2017
(Continued)

OTHER PUBLICATIONS

International Search Report and Written Opinion of the International Searching Authority in connection with International Application No. PCT/KR2019/006440 dated 12 pages.
(Continued)

*Primary Examiner* — Md S Elahee

(57) ABSTRACT

The present document relates to a method and an electronic device for adjusting an output level of a speaker on the basis of a distance from an external electronic device, and the electronic device may comprise: a speaker; a first communication circuit; a second communication circuit; a processor; and a memory electrically connected to the processor, wherein the memory stores instructions that, when executed, (Continued)

cause the processor to: receive a signal, broadcast by an external electronic device, through the first communication circuit; determine a distance from the external electronic device at least on the basis of the received signal; and adjust, at a designated level, an output level of the speaker for outputting an audio signal received from the external electronic device by using the second communication circuit, at least on the basis of the distance determined to belong to a designated range. In addition, various embodiments are possible.

15 Claims, 11 Drawing Sheets

(58) Field of Classification Search
USPC .................................................. 379/406.02
See application file for complete search history.

(56) References Cited

U.S. PATENT DOCUMENTS

| 9,197,191 | B2 | 11/2015 | Kawabata |
| 9,667,284 | B1 | 5/2017 | Gean et al. |
| 10,148,811 | B2 | 12/2018 | Kim et al. |
| 10,735,869 | B2 | 8/2020 | Hong et al. |
| 10,863,015 | B2 | 12/2020 | Tracz et al. |
| 2004/0252827 | A1 | 12/2004 | Sasaki |
| 2015/0222755 | A1 | 8/2015 | Chintala |
| 2016/0360342 | A1* | 12/2016 | Lin .......................... H04W 4/06 |
| 2017/0155756 | A1* | 6/2017 | Kim ...................... H04M 9/085 |

FOREIGN PATENT DOCUMENTS

| KR | 2016-0080538 A | 7/2016 |
| KR | 10-2017-0017381 A | 2/2017 |
| KR | 10-2017-0062331 A | 6/2017 |
| KR | 10-2017-0108328 A | 9/2017 |
| KR | 10-2018-0083161 A | 7/2018 |

OTHER PUBLICATIONS

Office Action dated May 20, 2022 in connection with Korean Patent Application No. 10-2018-0092905, 10 pages.

* cited by examiner

METHOD AND ELECTRONIC DEVICE FOR ADJUSTING OUTPUT LEVEL OF SPEAKER ON BASIS OF DISTANCE FROM EXTERNAL ELECTRONIC DEVICE

CROSS-REFERENCE TO RELATED APPLICATIONS

This application is a 371 National Stage of International Application No. PCT/KR2019/006440, filed May 29, 2019, which claims priority to Korean Patent Application No. 10-2018-0092905, filed Aug. 9, 2018, the disclosures of which are herein incorporated by reference in their entirety.

BACKGROUND

1. Field

The disclosure relates to an electronic device and a method thereof and, more particularly, to an electronic device and a method for preventing howling caused during a call.

2. Description of Related Art

Howling is a phenomenon by which, when a sound input into a microphone is amplified and then output through a speaker, if a portion of the output is repeatedly input into the microphone and amplified, a frequency output as resonance interference gradually increases and specific noise is generated. When the howling phenomenon is generated while a call is performed between electronic devices, it may be impossible to normally perform the call between users.

In order to prevent the howling phenomenon, a method of, when a signal in a frequency band predicted as howling is input into the microphone, removing the signal in the corresponding frequency band through a band-stop filter may be used.

SUMMARY

A method of detecting a signal causing howling and processing the signal in the corresponding frequency band through a filter processes an incoming signal after the signal causing howling has first flowed in, and thus cannot prevent the generation of howling in advance.

A method of detecting a change in a level of the signal input into the microphone and removing howling through an adaptive filter may also remove a speaker's voice.

In a group call (for example, push-to-talk (PTT)) service environment in which a multiparty call is possible, if a howling prediction signal is removed through a filter, even a listener who is remotely located and thus irrelevant to the generation of howling may hear a distorted sound.

In accordance with an aspect of the disclosure, an electronic device includes: a speaker; a first communication circuit; a second communication circuit; a processor; and a memory electrically connected to the processor, wherein the memory is configured to store instructions causing the processor to, when executed, receive a signal broadcasted from an external electronic device through the first communication circuit, determine a distance to the external electronic device, based at least on the received signal, and control output power of the speaker for outputting an audio signal received from the external electronic device to be a predetermined strength through the second communication circuit, based at least on a determination that the distance is within a predetermined range.

In accordance with another aspect of the disclosure, an electronic device includes: a microphone; a speaker; a communication circuit; a processor; and a memory electrically connected to the processor, wherein the memory stores instructions causing the processor to, when executed, receive a first audio signal output through a speaker of an external electronic device through the microphone, determine a distance to the external electronic device, based at least on the received first audio signal, and control output power of the speaker for outputting an audio signal received from the external electronic device to be a predetermined strength through the communication circuit, based at least on a determination that the distance is within a predetermined range.

In accordance with another aspect of the disclosure, an electronic device includes: a microphone; a speaker; a communication circuit; a processor; and a memory electrically connected to the processor, wherein the memory stores instructions causing the processor to, when executed, receive a first audio signal through the microphone, receive a second audio signal from an external electronic device through the communication circuit, calculate correlation between the first audio signal and the second audio signal, determine a distance to the external electronic device, based at least on the correlation, and control output power of the speaker for outputting the second audio signal to be a predetermined strength, based at least on a determination that the distance is within a predetermined range.

An electronic device according to various embodiments of the disclosure can prevent the generation of howling in advance by determining a situation in which howling can be generated on the basis of whether electronic devices performing a call are close to each other.

An electronic device according to various embodiments of the disclosure can prevent a phenomenon in which a speaker's voice is removed by controlling an output volume of a speaker of a short-distance electronic device, which may have howling.

An electronic device according to various embodiments of the disclosure can allow an even listener located at a long distance to hear a speaker's voice which is not distorted by controlling an output volume of a speaker of a short-distance electronic device, which may have howling during a multiparty call.

DETAILED DESCRIPTION

Figure 1:
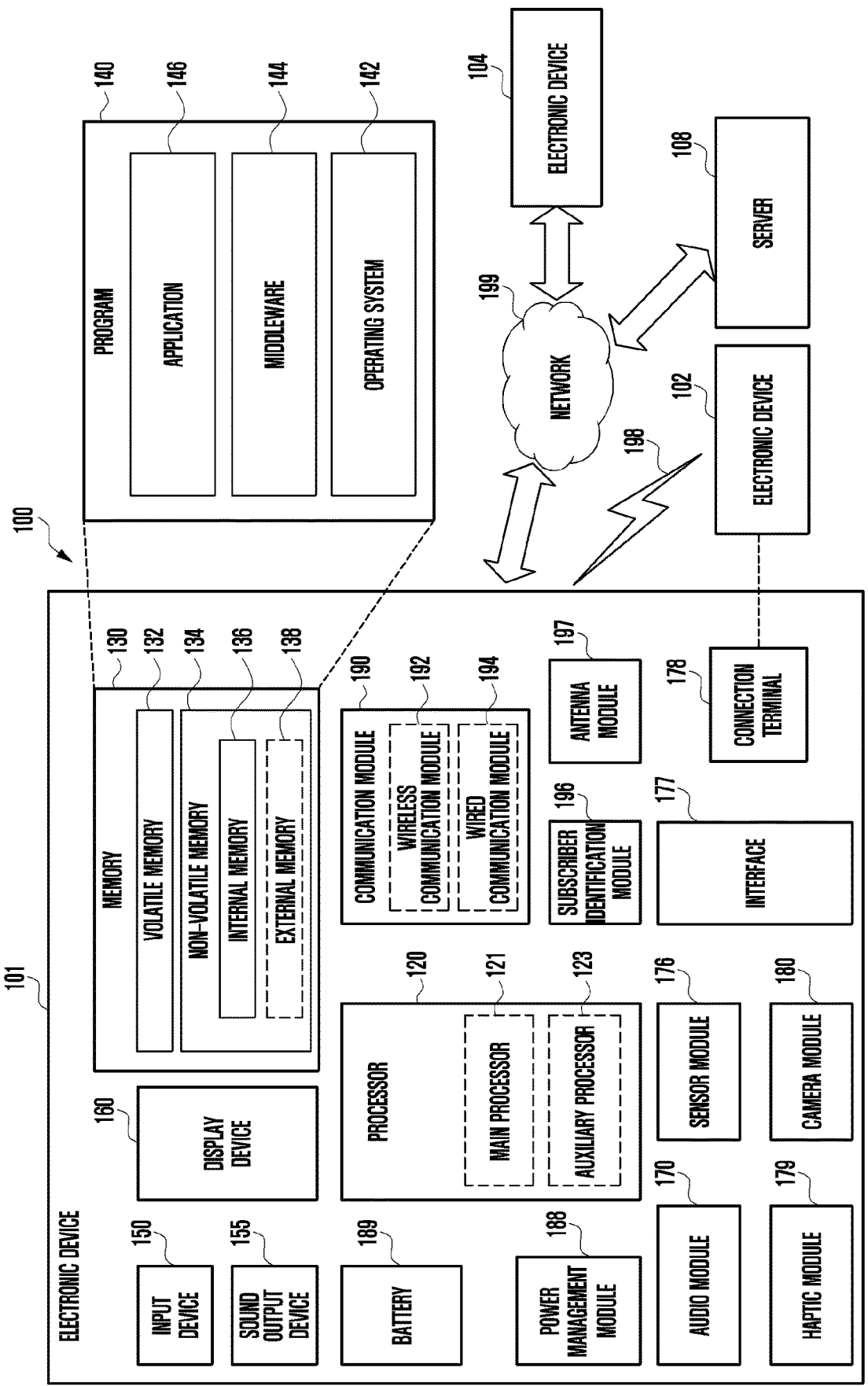
FIG. 1 is a block diagram illustrating an electronic device within a network environment according to various embodiments of the disclosure.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector), The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
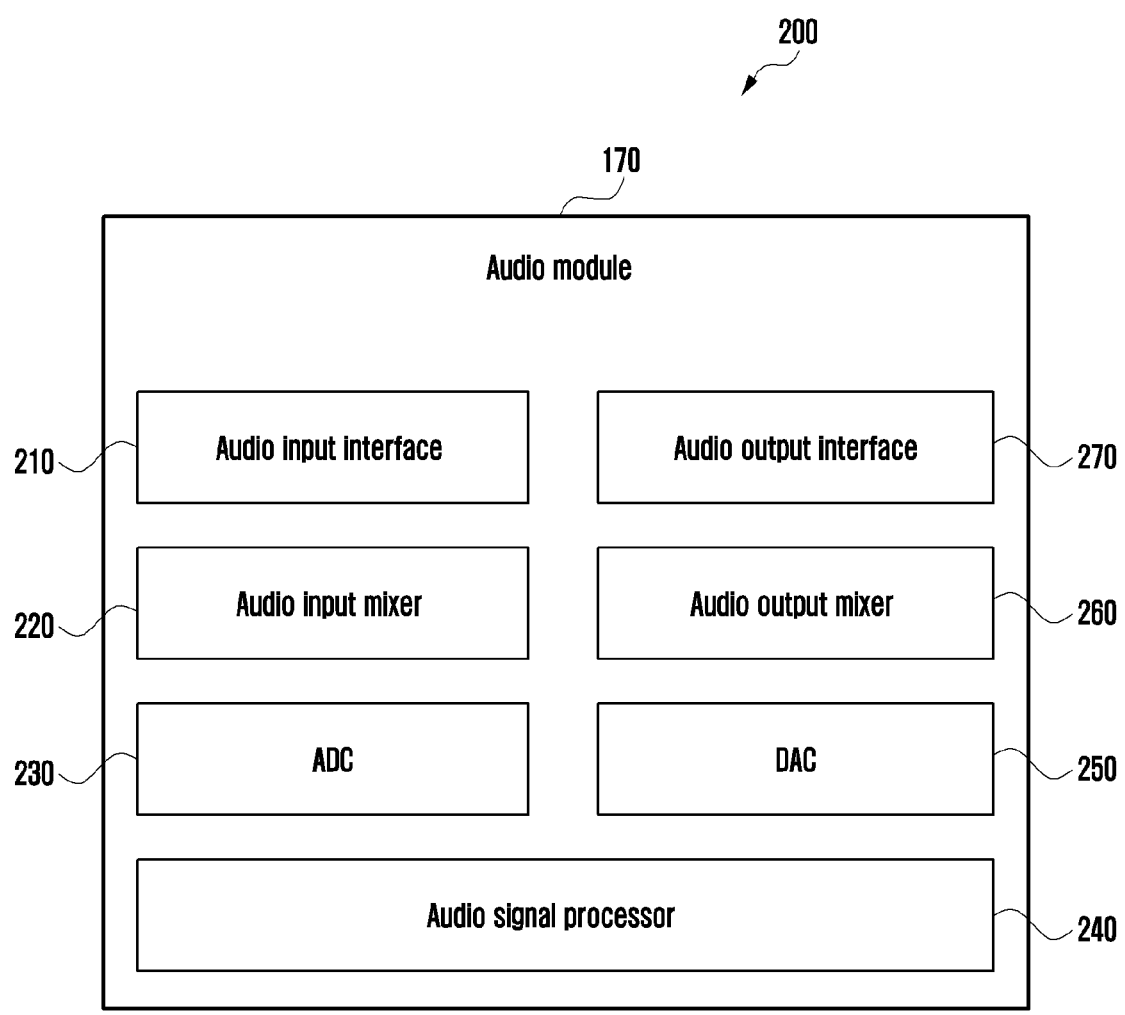
FIG. 2 is a block diagram illustrating an audio module according to various embodiments of the disclosure.

FIG. 2 is a block diagram 200 illustrating the audio module 170 according to various embodiments.

Referring to FIG. 2, the audio module 170 may include, for example, an audio input interface 210, an audio input mixer 220, an analog-to-digital converter (ADC) 230, an audio signal processor 240, a digital-to-analog converter (DAC) 250, an audio output mixer 260, or an audio output interface 270.

The audio input interface 210 may receive an audio signal corresponding to a sound obtained from the outside of the electronic device 101 via a microphone (e.g., a dynamic microphone, a condenser microphone, or a piezo microphone) that is configured as part of the input device 150 or separately from the electronic device 101. For example, if an audio signal is obtained from the external electronic device 102 (e.g., a headset or a microphone), the audio input interface 210 may be connected with the external electronic device 102 directly via the connecting terminal 178, or wirelessly (e.g., Bluetooth™ communication) via the wireless communication module 192 to receive the audio signal. According to an embodiment, the audio input interface 210 may receive a control signal (e.g., a volume adjustment signal received via an input button) related to the audio signal obtained from the external electronic device 102. The audio input interface 210 may include a plurality of audio input channels and may receive a different audio signal via a corresponding one of the plurality of audio input channels, respectively. According to an embodiment, additionally or alternatively, the audio input interface 210 may receive an audio signal from another component (e.g., the processor 120 or the memory 130) of the electronic device 101.

The audio input mixer 220 may synthesize a plurality of inputted audio signals into at least one audio signal. For example, according to an embodiment, the audio input mixer 220 may synthesize a plurality of analog audio signals inputted via the audio input interface 210 into at least one analog audio signal.

The ADC 230 may convert an analog audio signal into a digital audio signal. For example, according to an embodiment, the ADC 230 may convert an analog audio signal received via the audio input interface 210 or, additionally or alternatively, an analog audio signal synthesized via the audio input mixer 220 into a digital audio signal.

The audio signal processor 240 may perform various processing on a digital audio signal received via the ADC 230 or a digital audio signal received from another component of the electronic device 101. For example, according to an embodiment, the audio signal processor 240 may perform changing a sampling rate, applying one or more filters, interpolation processing, amplifying or attenuating a whole or partial frequency bandwidth, noise processing (e.g., attenuating noise or echoes), changing channels (e.g., switching between mono and stereo), mixing, or extracting a specified signal for one or more digital audio signals. According to an embodiment, one or more functions of the audio signal processor 240 may be implemented in the form of an equalizer.

The DAC 250 may convert a digital audio signal into an analog audio signal. For example, according to an embodiment, the DAC 250 may convert a digital audio signal processed by the audio signal processor 240 or a digital audio signal obtained from another component (e.g., the processor (120) or the memory (130)) of the electronic device 101 into an analog audio signal.

The audio output mixer 260 may synthesize a plurality of audio signals, which are to be outputted, into at least one audio signal. For example, according to an embodiment, the audio output mixer 260 may synthesize an analog audio signal converted by the DAC 250 and another analog audio signal (e.g., an analog audio signal received via the audio input interface 210) into at least one analog audio signal.

The audio output interface 270 may output an analog audio signal converted by the DAC 250 or, additionally or alternatively, an analog audio signal synthesized by the audio output mixer 260 to the outside of the electronic device 101 via the sound output device 155. The sound output device 155 may include, for example, a speaker, such as a dynamic driver or a balanced armature driver, or a receiver. According to an embodiment, the sound output device 155 may include a plurality of speakers. In such a case, the audio output interface 270 may output audio signals having a plurality of different channels (e.g., stereo channels or 5.1 channels) via at least some of the plurality of speakers. According to an embodiment, the audio output interface 270 may be connected with the external electronic device 102 (e.g., an external speaker or a headset) directly via the connecting terminal 178 or wirelessly via the wireless communication module 192 to output an audio signal.

According to an embodiment, the audio module 170 may generate, without separately including the audio input mixer 220 or the audio output mixer 260, at least one digital audio signal by synthesizing a plurality of digital audio signals using at least one function of the audio signal processor 240.

According to an embodiment, the audio module 170 may include an audio amplifier (not shown) (e.g., a speaker amplifying circuit) that is capable of amplifying an analog audio signal inputted via the audio input interface 210 or an audio signal that is to be outputted via the audio output interface 270. According to an embodiment, the audio amplifier may be configured as a module separate from the audio module 170.

Figure 3:
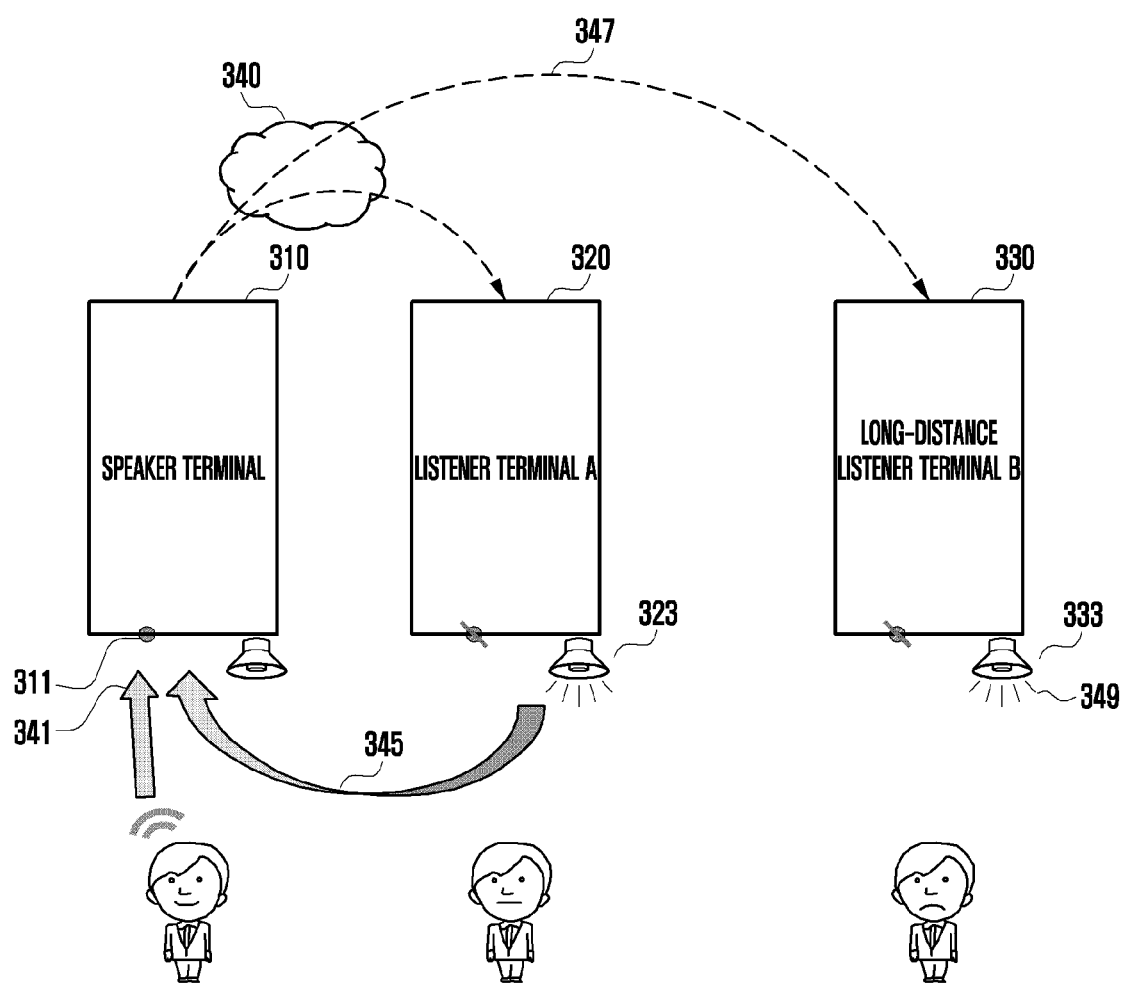
FIG. 3 schematizes a call situation between electronic devices according to various embodiments of the disclosure.

FIG. 3 schematizes a call situation between electronic devices according to various embodiments of the disclosure.

FIG. 3 illustrates the case in which three electronic devices according to various embodiments use a group call service, but various embodiments disclosed in this document are not limited to the case in which the group call service is used and may be applied to various situations in which howling may be generated, such as a one-to-on voice call or video call.

Referring to FIG. 3, a first user of a speaker terminal 310, a second user of a short-distance listener terminal A320, and a third user of a long-distance listener terminal B 330 may use a call service through a network 340. The second user and the third user may hear a voice of the first user through speakers by configuring the short-distance listener terminal A and the long-distance listener terminal B to be in a speaker mode (for example, a speakerphone mode of a portable terminal). In the case of the short-distance listener terminal A320, a voice 341 of the first user of the speaker terminal 310 is input into a microphone 311 of the speaker terminal 310, and output through a speaker 323 of the short-distance listener terminal A 320 through the call service (a path 343). The listener terminal A320 is located close to the speaker terminal 310, and thus a sound output through the speaker 323 of the listener terminal A 320 may be input into the microphone 311 of the speaker terminal 310. Accordingly, howling may be generated between the speaker terminal 310 and the listener terminal A 320.

In the case of the long-distance listener terminal B 330, the long-distance listener terminal B is far apart from the speaker terminal 310, and thus a sound 349 output through a speaker 333 of the listener terminal B 330 is not input to the microphone 311 of the speaker terminal 310. Accordingly, howling is not generated between the speaker terminal 310 and the listener terminal B 330.

That is, when the distance between the speaker terminal 310 and the listener terminal is short, it may be determined that a howling phenomenon occurs. On the other hand, when the distance between the speaker terminal 310 and the listener terminal is long, it may be determined that a howling phenomenon does not occur.

The listener terminal A 320 may detect and analyze, for example, a specific signal output from the speaker terminal 310 and determine whether the speaker terminal 310 is located close to the listener terminal A 320. The listener terminal A 320 may identify, for example, ID information included in the detected signal or analyze a pattern of the detected signal, and determine whether the speaker terminal 310 is located at a short distance. When it is determined that, for example, the speaker terminal 310 is located at the short distance, the listener terminal A 320 may reduce the output of the speaker to a predetermined level or lower or process muting not to output a sound.

The listener terminal B 330 is located far apart from the speaker terminal 310, and thus may not detect the specific signal output from the speaker terminal 310. Accordingly, the listener terminal B 330 may maintain the output of the speaker and perform the call service with the speaker terminal 310.

According to various embodiments, the first user of the speaker terminal 310 may simultaneously make calls with the second user of the short-distance listener terminal A 320 and the third user of the long-distance listener terminal B 330 through a push-to-talk (PTT) service corresponding to a multiparty call service. In this case, when the voice output through the speaker of the listener terminal A 320 is input into the microphone 311 of the speaker terminal 310, the howling phenomenon may occur in the listener terminal B 330. When the speaker terminal 310 removes a howling signal through a band-stop filter (for example, a notch filter) for removing a specific frequency or an adaptive filter, the third user of the listener terminal B 330 which is not relevant to the generation of howling may hear a distorted sound. According to various embodiments disclosed in this document, the listener terminal, rather than the speaker terminal 310, measures the distance from the speaker terminal 310, determines whether howling can be generated, and then controls the output of the speaker of the listener terminal, so as to prevent the generation of howling.

Figure 4:
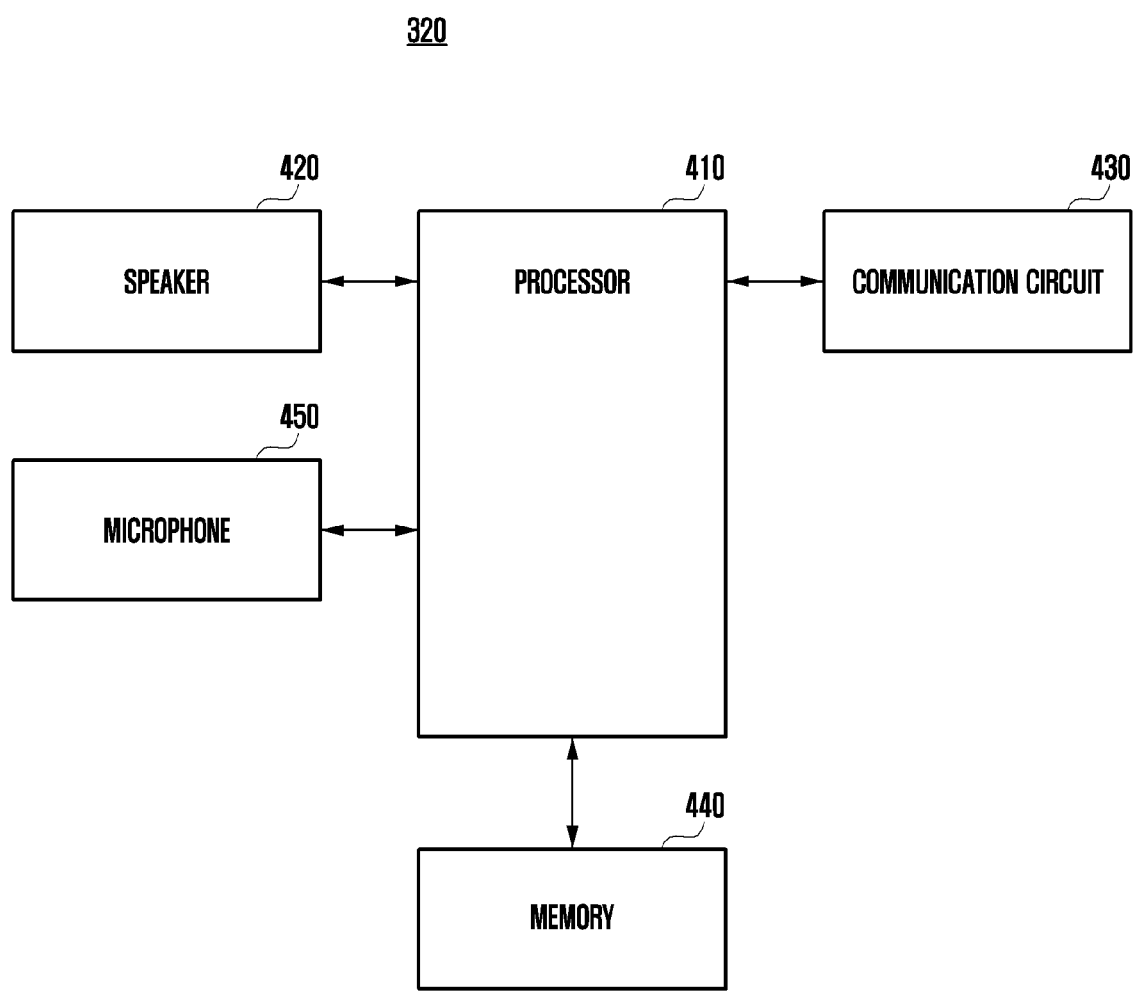
FIG. 4 is a block diagram illustrating an electronic device according to various embodiments of the disclosure.

FIG. 4 is a block diagram illustrating an electronic device according to various embodiments of the disclosure.

Referring to FIG. 4, an electronic device 320 (for example, the electronic device 101 of FIG. 1) according to various embodiments of the disclosure may include a processor 410 (for example, the processor 120 of FIG. 1), a speaker 420 (for example, the sound output device 155 of FIG. 1), a microphone 450 (for example, the input device 150 of FIG. 1), a communication circuit 430 (for example, the communication module 190 of FIG. 1), and a memory 440 (for example, the memory 130 of FIG. 1), and at least some of the illustrated elements may be omitted or replaced.

According to various embodiments, the processor 410 is an element for controlling each element of the electronic device and/or processing calculations for communication or data, and may include at least some of the configuration and/or functions of the processor 120 of FIG. 1. The processor 410 may be electrically connected to an internal element of the electronic device, such as the communication circuit 430, the speaker 420, the microphone 450, or the memory 440.

According to various embodiments, the communication circuit 430 may establish a communication channel with an external electronic device and transmit and receive various pieces of data to and from the external electronic device. According to various embodiments, the communication circuit 430 may include a cellular communication module and may be configured to be connected to a cellular network (for example, 3G, LTE, 5G, Wibro, or Wimax). According to various embodiments, the communication circuit 430 may include a short-range communication module and transmit and receive data to and from an external electronic device through short-range communication (for example, Bluetooth, Bluetooth low energy (BLE), or UWB), but is not limited thereto.

According to various embodiments, the short-range communication module may be a Bluetooth low energy (BLE) module for supporting BLE communication to perform BLE communication. The BLE module may support a scan function for waiting for receiving a communication signal from an external electronic device. The BLE module may perform all of the operation for receiving a broadcasting signal from an external electronic device (for example, scan mode) and the operation for transmitting a broadcasting signal to the external electronic device.

In general, the BLE communication is a Bluetooth technology capable of transmitting and receiving low-power low-capacity data based on a frequency band of about 2.4 GHz. Particularly, when an average transmission rate is equal to or lower than about 10 kbps, power efficiency is good and thus the use for many years without any battery exchange is possible, and the technology is very suitable for very small IoT device in which power supply is limited. In the case of Bluetooth standards 4.0, 4.1, 4.2, and 5.0 supporting BLE communication, information of about 29 Bytes may be carried in common.

According to various embodiments, the speaker 420 may output various audio sounds under the control of the processor 410.

According to various embodiments, the memory 440 may store instructions for the operation of the processor 410.

According to various embodiments, the microphone 450 may receive a sound from the surroundings of the electronic device.

Figure 5:
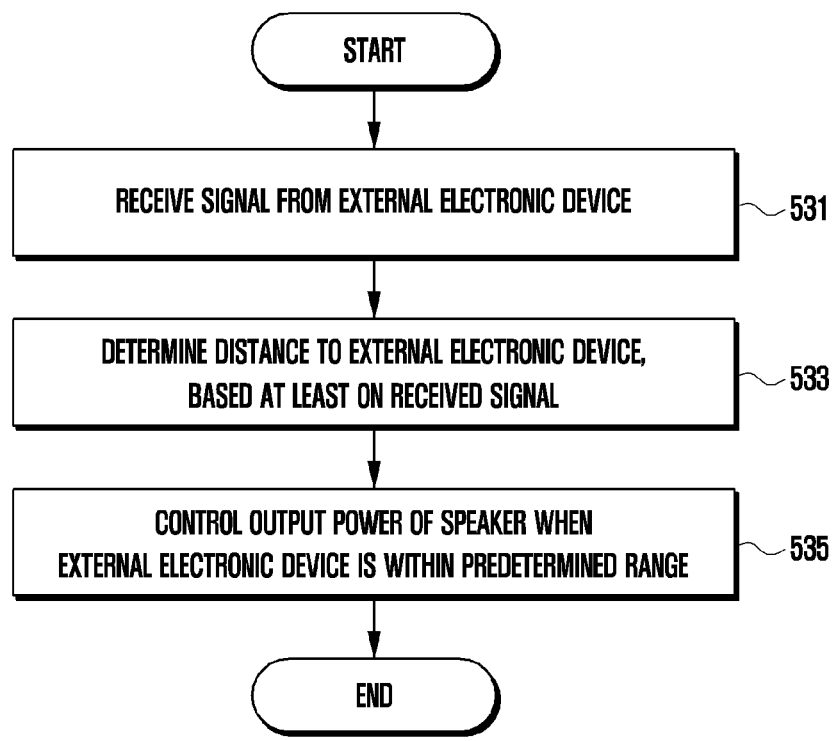
FIG. 5 is a flowchart illustrating a method of preventing the generation of howling of an electronic device according to various embodiments of the disclosure.

FIG. 5 is a flowchart illustrating a method of preventing the generation of howling of an electronic device according to various embodiments of the disclosure.

The electronic device 320 according to various embodiments of the disclosure may include the processor 410, the speaker 420, at least one communication circuit 430, and the memory 440.

According to various embodiments, at least one communication circuit 430 may include a first communication circuit supporting short-range communication and a second communication circuit supporting cellular communication.

According to various embodiments, the processor 410 may receive a signal broadcasted from the external electronic device 310 through, for example, the first communication circuit 430. The processor 410 may identify, for example, ID information included in the received signal.

According to various embodiments, the ID information included in the received signal may be information for identifying the external electronic device 310.

According to various embodiments, the processor 410 may determine the distance between the electronic device 320 and the external electronic device 310 on the basis of the received signal. The processor 410 may determine the distance to the external electronic device 310 by analyzing, for example, a strength of the received signal. The processor 410 may identify whether the strength of the received signal is higher than or equal to a predetermined threshold value. For example, when it is determined that the strength of the received signal is higher than or equal to the predetermined threshold value, the processor 410 may determine that the external electronic device 310 is located within a predetermined range from the electronic device 320.

According to various embodiments, the processor 410 may store or delete the ID information of the external electronic device 310 in or from a list in which the ID information of the external electronic device 310, which may generate howling, is stored on the basis of the result of analysis of the detected signal.

According to various embodiments, the processor 410 may identify whether, for example, the electronic device 320 operates in a speaker mode. The processor 410 may control, for example, output power of the speaker 420. When it is determined that, for example, the external electronic device 310 is within the predetermined range from the electronic device 320, the processor 410 may control the output power of the speaker 420 to be predetermined power.

According to various embodiments, the processor 410 may activate the short-range communication module in response to, for example, initiation of a call of the electronic device 320 in the speaker mode.

Referring to FIG. 5, in operation 531, the processor 410 may receive a signal broadcasted from the external electronic device 310 through the communication circuit 430. The external electronic device 310 may broadcast a signal for detection separately from the call service according to initiation of the call service, and the broadcasted signal for detection may include, for example, ID information of the external electronic device 310. The external electronic device 310 may periodically broadcast the signal for detection. The signal for detection may be an advertising packet broadcasted through, for example, a BLE module.

According to various embodiments, in operation 533, the processor 410 may determine the distance to the external electronic device 310 on the basis of the received signal. The processor 410 may determine whether the external electronic device 310 is within a predetermined range on the basis of the strength of the received signal. The processor 410 may identify, for example, ID information included in the received signal and analyze the strength of the received signal. The processor 410 may identify information on the external electronic device 310 having broadcasted the signal through the ID information included in the received signal. The processor 410 may analyze, for example, the strength of the received signal and, when the strength higher than or equal to a predetermined threshold value is detected on the basis of the analysis result, determine that the external electronic device 310 is located within a predetermined range from the electronic device 320. When it is determined that the external electronic device 310 is located within the predetermined range from the electronic device 320, it may be determined that howling can be generated.

According to various embodiments, when it is determined that the external electronic device 310 is within the predetermined range from the electronic device 320, the processor 410 may control output power of the speaker 420 in operation 535. In this case, the processor 410 may reduce, for example, a volume of a voice tone output through the speaker 420 to a level of about 10% of a preset volume or may configure a mute state not to output a voice tone through the speaker 420.

According to various embodiments, when it is determined that the external electronic device 310 is within the predetermined range from the electronic device 320, the processor 410 may apply a predetermined gain to an audio signal received from the external electronic device 310 through the second communication circuit. The processor may apply a predetermined gain value such that output power of the audio signal received from the external electronic device 310 through the second communication circuit becomes equal to or lower than a preset reference.

Figure 6:
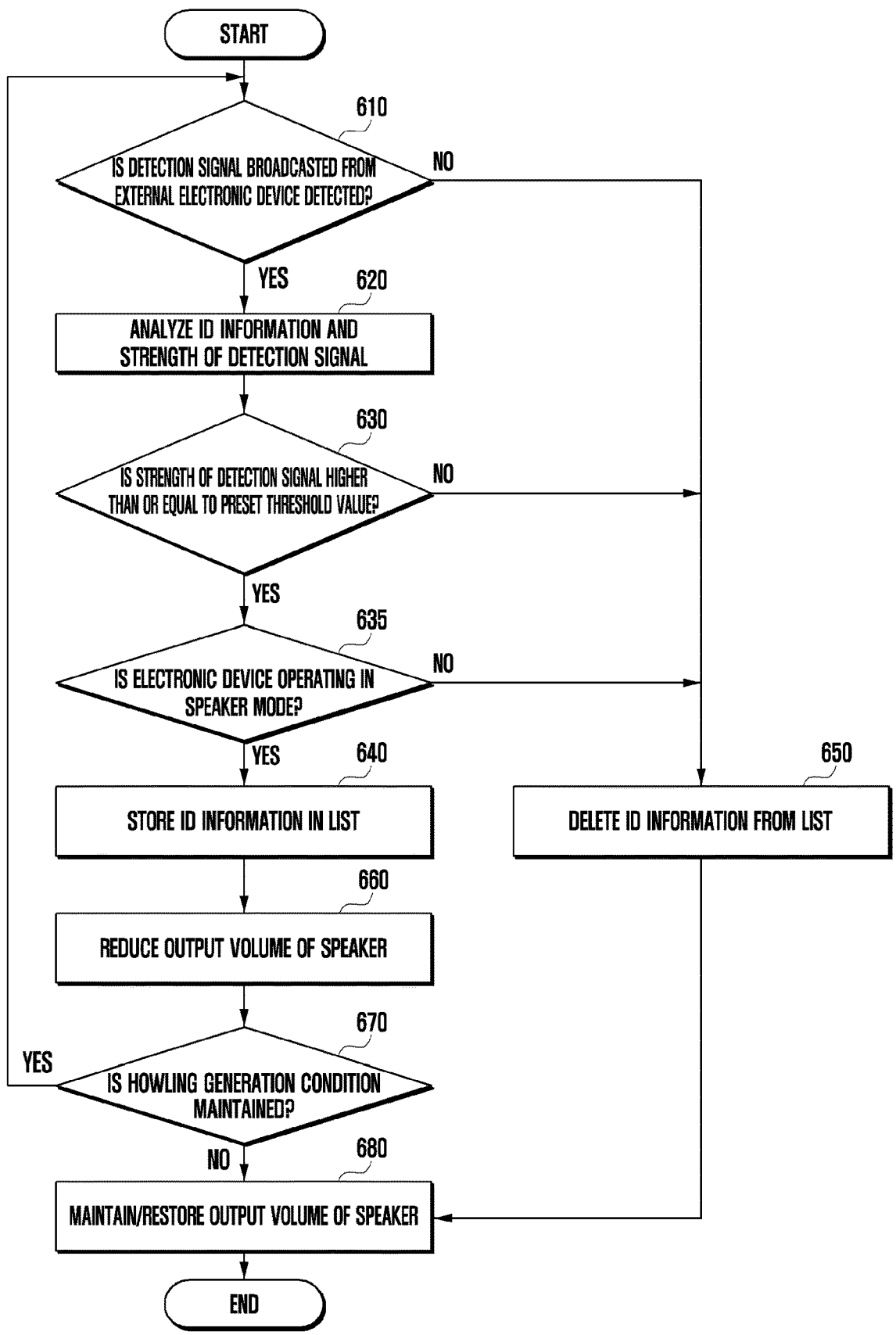
FIG. 6 is a flowchart illustrating a method of preventing the generation of howling of an electronic device according to various embodiments of the disclosure.

FIG. 6 is a flowchart illustrating a method of preventing the generation of howling of an electronic device according to various embodiments of the disclosure. The content which overlaps that in FIG. 5 is omitted.

Referring to FIG. 6, in operation 610, the processor 410 may detect a signal broadcasted from the external electronic device 310. According to an embodiment, in order to detect the signal broadcasted from the external electronic device 310, the processor 410 may control to perform an operation for periodically scanning by the first communication circuit. According to an embodiment, the signal may be an advertising packet broadcasted through BLE communication.

When the signal is detected, the processor 410 may analyze ID information and a strength of the signal in operation 620.

When the signal is not detected, the processor 410 may delete ID information of the external electronic device 310 from a list in which ID information of the external electronic device 310 in which howling can be generated is stored in operation 650. According to an embodiment, when the signal broadcasted from the external electronic device 310 is not detected for a predetermined time, the processor 410 may continuously delete ID information of the external electronic device 310 from the list. According to an embodiment, when ID information of the external electronic device 310 is stored in the list, the processor 410 may determine that howling can be generated. When the ID information of the external electronic device 310 is deleted from the list, the processor 410 may determine that howling is not generated.

According to various embodiments of the disclosure, in operation 630, the processor 410 may determine whether the strength of the signal analyzed in operation 620 is higher than or equal to a preset threshold value. When the strength of the signal is higher than or equal to the threshold value, the processor 410 may determine that the external electronic device 310 is within a predetermined range from the electronic device 320. When the strength of the signal is equal to or lower than the preset threshold value, the processor 410 may determine that the external electronic device 310 is not within the predetermined range from the electronic device 320.

When the strength of the signal is lower than the threshold value, the processor 410 may proceed to operation 650 and delete the ID information of the external electronic device 310 from the list. In this case, the processor 410 may determine that howling is not generated by the external electronic device 310 and maintain a volume of a voice tone output through the speaker 420 in operation 680.

When the strength of the signal is higher than or equal to the threshold value, the processor 410 may identify whether the electronic device 320 operates in the speaker mode in operation 635. The speaker mode may be a mode in which a voice tone is output through the speaker (for example, a speakerphone mode of the portable terminal).

When the electronic device is operating in the speaker mode, the processor 410 may store ID information of the external electronic device 310 in the list in operation 640. In this case, the processor 410 may determine that howling can be generated by the external electronic device 310, control output power of the speaker 420, and control the volume of the voice tone output through the speaker 420 to be equal to or lower than a predetermined reference in operation 660.

According to various embodiments, the processor 410 may apply a predetermined gain to an audio signal received from the external electronic device 310 through the second communication circuit in operation 660. The processor may apply a predetermined gain value such that output power of the audio signal received from the external electronic device 310 through the second communication circuit becomes equal to or lower than a preset reference.

When the electronic device 320 is not operating in the speaker mode and is operating in other modes, the processor 410 may proceed to operation 650 and delete the ID information of the external electronic device 310 from the list. Other modes, which are not the speaker mode, may include, for example, an earphone mode in which a voice tone is output through earphones and a Bluetooth mode in which a voice tone is output through a Bluetooth device connected through Bluetooth communication. In this case, the processor 410 may determine that howling is not generated by the external electronic device 310 and maintain a volume of a voice tone output through the speaker 420 in operation 680.

According to various embodiments, in operation 670, the processor 410 may determine whether a howling generation condition is maintained. The case in which it is determined that the howling generation condition is not maintained and is changed may include, for example, the case in which the speaker mode is released (for example, the case in which a user input for releasing the speaker mode is received or switching to the earphone mode to output a sound through earphones is performed), the case in which a strength of a detection signal is reduced, the case in which a call with the external electronic device 310 ends, and the case in which the external electronic device escapes a predetermined range.

When it is determined that the howling generation condition is maintained, the processor may proceed to operation 610 and identify again whether the signal broadcasted from the external electronic device 310 is detected.

When it is determined that the howling generation condition is not maintained and is changed, the processor 410 may proceed to operation 680 and restore the volume of the voice tone output through the speaker 420 as original. The processor 410 may release the mute state of the speaker or reconfigure the output power of the speaker as a default setting value or output power before the output power is reduced. The output power of the default setting value may be, for example, output power to which a default value is applied.

The electronic device 320 according to various embodiments may receive a broadcasting signal (advertising signal or advertising packet) generated by the adjacent external electronic device 310 through, for example, BLE scan. The external electronic device 310 supporting a BLE communication function may periodically broadcast the advertising packet. The external electronic device 310 may include ID information in the advertising packet and broadcast the advertising packet. The electronic device 320 may receive the advertising packet broadcasted by the adjacent external electronic device 310 by periodically scanning a preset frequency. The electronic device 320 may identify ID information included in the advertising packet and identify that the advertising packet is the signal broadcasted by the external electronic device 310. The electronic device 320 may measure a strength of a received signal of the advertising packet. When the strength of the received signal of the advertising packet is higher than or equal to a predetermined threshold value, the electronic device 320 may determine that the external electronic device 310 is within a predetermined range. When it is determined that the external electronic device 310 is located within the predetermined range from the electronic device 320, the electronic device 320 may control output power of the speaker 420 to reduce a volume of a voice tone output through the speaker 420 to a predetermined level or process muting not to output the voice tone. The processor 410 according to various embodiments may apply a predetermined gain to an audio signal received from the external electronic device through the second communication circuit to reduce the volume of the voice tone output through the speaker 420 to a predetermined level or configure a mute state.

Figure 7:
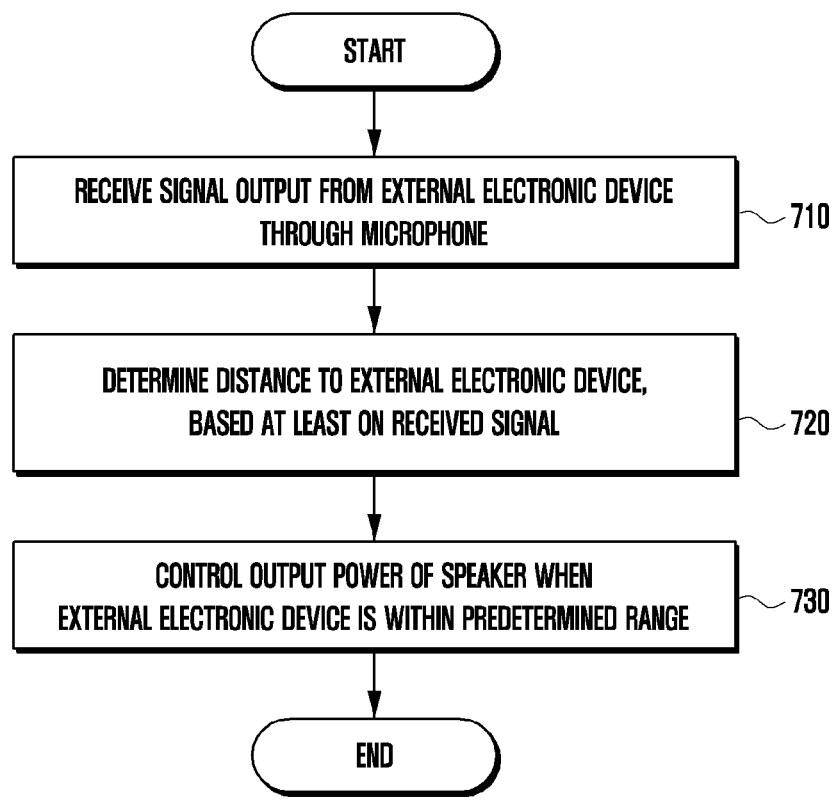
FIG. 7 is a flowchart illustrating a method of preventing the generation of howling of an electronic device according to various embodiments of the disclosure.

FIG. 7 is a flowchart illustrating a method of preventing the generation of howling of an electronic device according to various embodiments of the disclosure.

The electronic device 320 according to various embodiments of the disclosure may include the processor 410, the speaker 420, the microphone 450, the communication circuit 430, and the memory 440.

According to various embodiments, the processor 410 may receive, for example, an audio signal for detection output from the external electronic device 310 through the microphone 450. The processor 410 may analyze, for example, a pattern of the received audio signal and determine whether the audio signal is a pre-arranged signal.

According to various embodiments, the audio signal may be, for example, an audio signal in a non-audible frequency band (for example, a signal in a frequency band equal to or lower than about 20 Hz or higher than or equal to 20 kHz), a signal having a pre-arranged waveform or repetition period, or an audio signal at a specific level.

According to various embodiments of the disclosure, the processor 410 may determine the distance to the external electronic device 310 on the basis of, for example, the received audio signal. The processor 410 may analyze, for example, the strength of the audio signal and determine whether the strength of the audio signal is higher than or equal to a preset threshold value. For example, when it is determined that the strength of the received detection signal is higher than or equal to the preset threshold value, the processor 410 may determine that the external electronic device 310 is located within a predetermined range from the electronic device 320.

According to various embodiments of the disclosure, the processor 410 may identify whether, for example, the electronic device 320 is operating in the speaker mode. The processor 410 may control the output of the speaker 420 on the basis of, for example, the strength of the received signal. When it is determined that the external electronic device 310 is within, for example, a predetermined range from the electronic device 320, the processor 410 may control the volume of the voice tone output through the speaker 420 to be equal to or lower than a predetermined reference.

According to various embodiments of the disclosure, the microphone 450 may receive a sound from the surroundings of the electronic device 320. The microphone 450 may receive an audio signal output from the external electronic device 310. For example, the microphone 450 may receive a detection signal in a non-audible band output from the external electronic device 310 and transmit information corresponding to the detection signal to the processor 410.

According to various embodiments of the disclosure, the communication circuit 430 is an element for transmitting and receiving data to and from various external electronic devices 310 and may include at least some of the configurations and/or functions of the communication module 190 of FIG. 1. The communication circuit 430 may be configured as a communication module supporting various types of communication schemes according to a characteristic of the electronic device 310. For example, the communication circuit 430 may be configured as various communication modules such as a mobile communication module supporting 2G, 3G, and 4G, and a communication module supporting Wi-Fi.

Referring to FIG. 7, in operation 710, the processor 410 may receive a signal output through the speaker of the external electronic device 310 through the microphone 450. The external electronic device 310 may output an audio signal for detection through the speaker of the external electronic device 310 separately from the cal service according to initiation of the call service. The audio signal for detection may be a signal having a pre-arranged specific pattern. The audio signal for detection may be, for example, an audio signal in a non-audible frequency band (for example, a signal in a frequency band equal to or lower than about 20 Hz or higher than or equal to about 20 kHz), a signal having a pre-arranged waveform or repetition period, or a signal at a specific level. The external electronic device 310 may periodically output, for example, an audio signal for detection through the speaker.

According to various embodiments, in operation 720, the processor 410 may determine the distance to the external electronic device 310 on the basis of the strength of the received detection signal. The processor 410 may identify whether, for example, a pattern of the received detection signal is a pre-arranged pattern and analyze the strength of the received detection signal. The processor 410 may determine whether the pattern of the detection signal is similar to the pre-arranged signal pattern and identify whether the external electronic device 310 outputs the detection signal. The processor 410 may analyze, for example, the strength of the received detection signal and, when the strength higher than or equal to a predetermined threshold value is detected on the basis of the analysis result, determine that the external electronic device 310 is located within a predetermined range from the electronic device 320. When it is determined that the external electronic device 310 is located within the predetermined range from the electronic device 320, it may be determined that howling can be generated.

According to various embodiments, when it is determined that the external electronic device 310 is within the predetermined range from the electronic device 320, the processor 410 may control output power of the speaker 420 in operation 730. In this case, the processor 410 may control, for example, the output power of the speaker 420 to be predetermined power to reduce a volume of a voice tone output through the speaker 420 to be equal to or lower than about 10% of a preset volume or configure a mute state not to output a voice tone through the speaker 420.

According to various embodiments, it is determined that the external electronic device 310 is within the predetermined range from the electronic device 320, the processor 410 may apply a predetermined gain to an audio signal received from the external electronic device 310 through the communication circuit. The processor may apply, for example, the predetermined gain value such that output power of the audio signal received from the external electronic device 310 through the communication circuit becomes equal to or lower than a preset reference.

Figure 8:
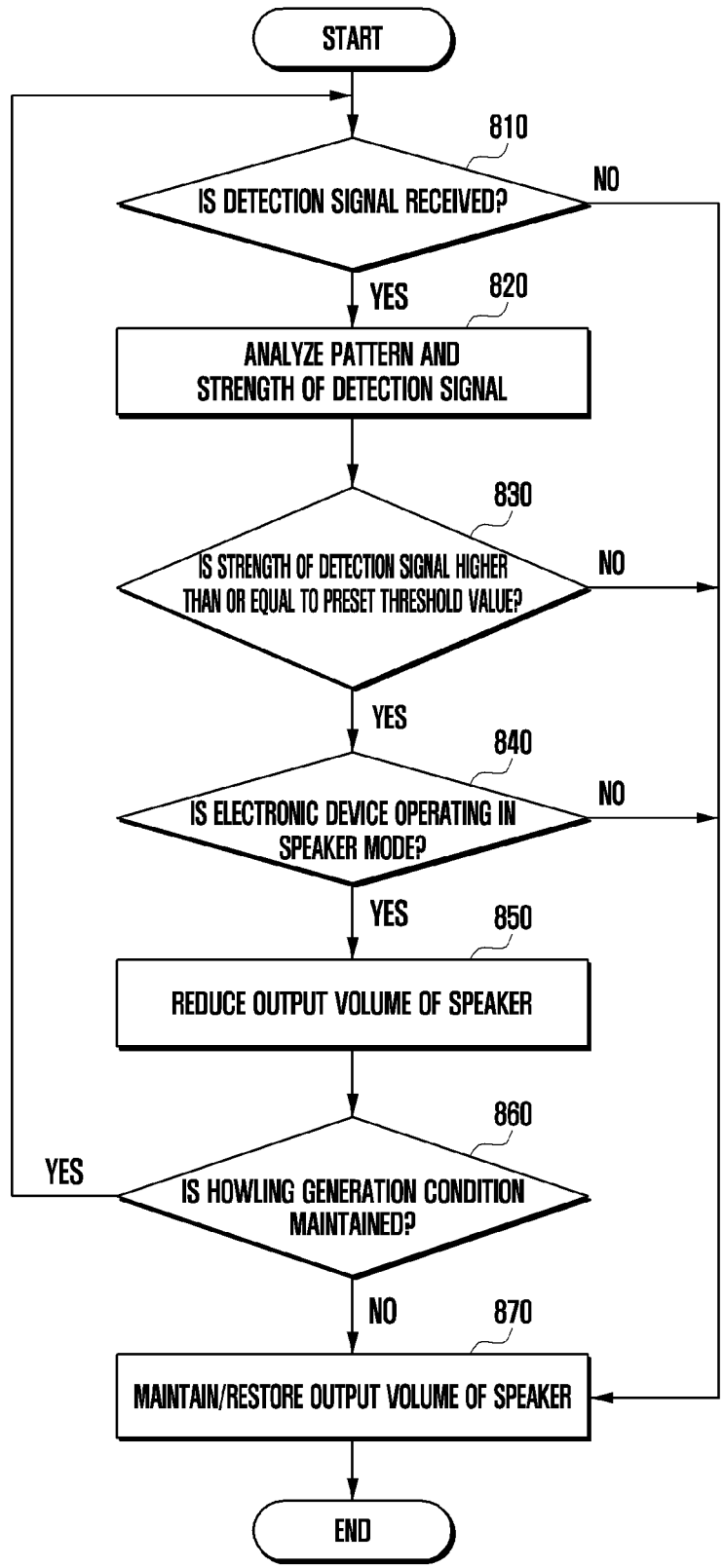
FIG. 8 is a flowchart illustrating a method of preventing the generation of howling of an electronic device according to various embodiments of the disclosure.

FIG. 8 is a flowchart illustrating a method of preventing the generation of howling of an electronic device according to various embodiments of the disclosure.

Referring to FIG. 8, in operation 810, the processor 410 may identify whether a detection signal output through the speaker of the external electronic device 310 is received through the microphone 450.

When the detection signal is received, the processor 410 may analyze a pattern and a strength of the received detection signal in operation 820. The processor 410 may determine whether the pattern of the detection signal is similar to the pre-arranged signal pattern and identify whether the external electronic device 310 outputs the detection signal.

When the detection signal is not detected, the processor 410 may proceed to operation 870, determine that howling is not generated, and maintain a volume of a voice tone output through the speaker 420.

According to various embodiments of the disclosure, the processor 410 may determine whether the strength of the detection signal analyzed in operation 820 is higher than or equal to a preset threshold value in operation 830. For example, when the strength of the detection signal is higher than or equal to the preset threshold value, the processor 410 may determine that the external electronic device 310 is within a predetermined range from the electronic device 320.

When the strength of the detection signal is lower than the preset threshold value, the processor 410 may determine that howling is not generated by the external electronic device 310 and maintain the volume of the voice tone output through the speaker 420 in operation 870.

When the strength of the detection signal is higher than or equal to the preset threshold value, the processor 410 may identify whether the electronic device 320 is operating in the speaker mode in operation 840.

When the electronic device 320 is operating in the speaker mode (for example, when the electronic device 320, which is a portable terminal, is operating in the speaker mode), the processor 410 may reduce the volume of the voice tone output through the speaker 420 to a predetermined level or lower in operation 850. The processor 410 may control output power of the speaker 420 to reduce the volume of the voice tone output through the speaker 420 to a predetermined level or lower or process muting not to output the voice tone. According to various embodiments, the processor 410 may reduce the volume of the voice tone output through the speaker 420 to a predetermined level or configure a mute state by applying a predetermined gain to an audio signal received from the external electronic device through the communication circuit.

When the electronic device 320 is not operating in the speaker mode (for example, when a sound is output through earphones), the processor 410 may determine that howling is not generated by the external electronic device 310 and maintain the volume of the voice tone output through the speaker 420 in operation 870.

According to various embodiments of the disclosure, the processor 410 may determine that a howling generation condition is maintained in operation 860. The case in which it is determined that the howling generation condition is not maintained and is changed may include, for example, the case in which the speaker mode is released (for example, the case in which a user input for releasing the speaker mode is received or switching to the earphone mode to output a sound through earphones is performed), the case in which a strength of a detection signal is reduced, the case in which a call with the external electronic device 310 ends, and the case in which the external electronic device escapes a predetermined range. The processor 410 may periodically identify whether a detection signal output through the speaker of the external electronic device 310 is received through, for example, the microphone 450.

When it is determined that the howling generation condition is maintained, the processor may proceed to operation 810 and identify again whether the external electronic device 310 receives the detection signal output from the external electronic device 310.

When it is determined that the howling generation condition is not maintained and is changed, the processor 410 may proceed to operation 870 and restore the volume of the voice tone output through the speaker 420 as original. The processor 410 may release the mute state of the speaker or reconfigure the output power of the speaker as a default setting value or output power before the output power is reduced. The output power of the default setting value may be, for example, output power to which a default value is applied.

Figure 9:
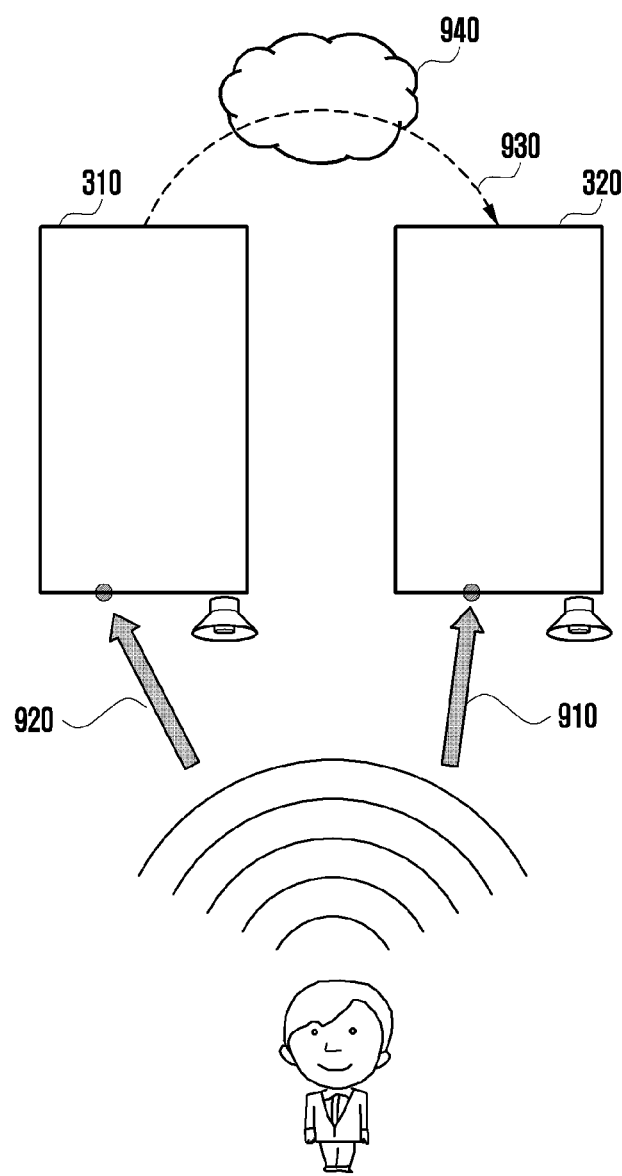
FIG. 9 simply schematizes a method of preventing the generation of howling of an electronic device according to various embodiments of the disclosure.

FIG. 9 simply schematizes a method of preventing the generation of howling of an electronic device according to various embodiments of the disclosure.

Referring to FIG. 9, the external electronic device 310 and the electronic device 320 may use a call service through a network 940. When the distance between the external electronic device 310 and the electronic device 320 is short, an audio signal 920 input into the external electronic device 310 may be input into the electronic device 320 as indicated by reference numeral 910. A voice signal from a speaker of the external electronic device 310 may be input into a microphone of the external electronic device 310 and also input into a microphone of the electronic device 320 located at short distance.

According to various embodiments, the electronic device 320 may receive the audio signal 910 through the microphone. The processor 410 may store the received audio signal 910.

According to various embodiments, the audio signal 920 input into the microphone of the external electronic device 310 may be transmitted to the electronic device 320 as a call signal 930 through the call service.

According to various embodiments, the electronic device 320 may calculate correlation between the call signal 930 received from the external electronic device 310 and the stored audio signal 910 through the call service. For example, when the calculated correlation is higher than or equal to a predetermined level, the electronic device 320 may determine that howling can be generated.

Figure 10:
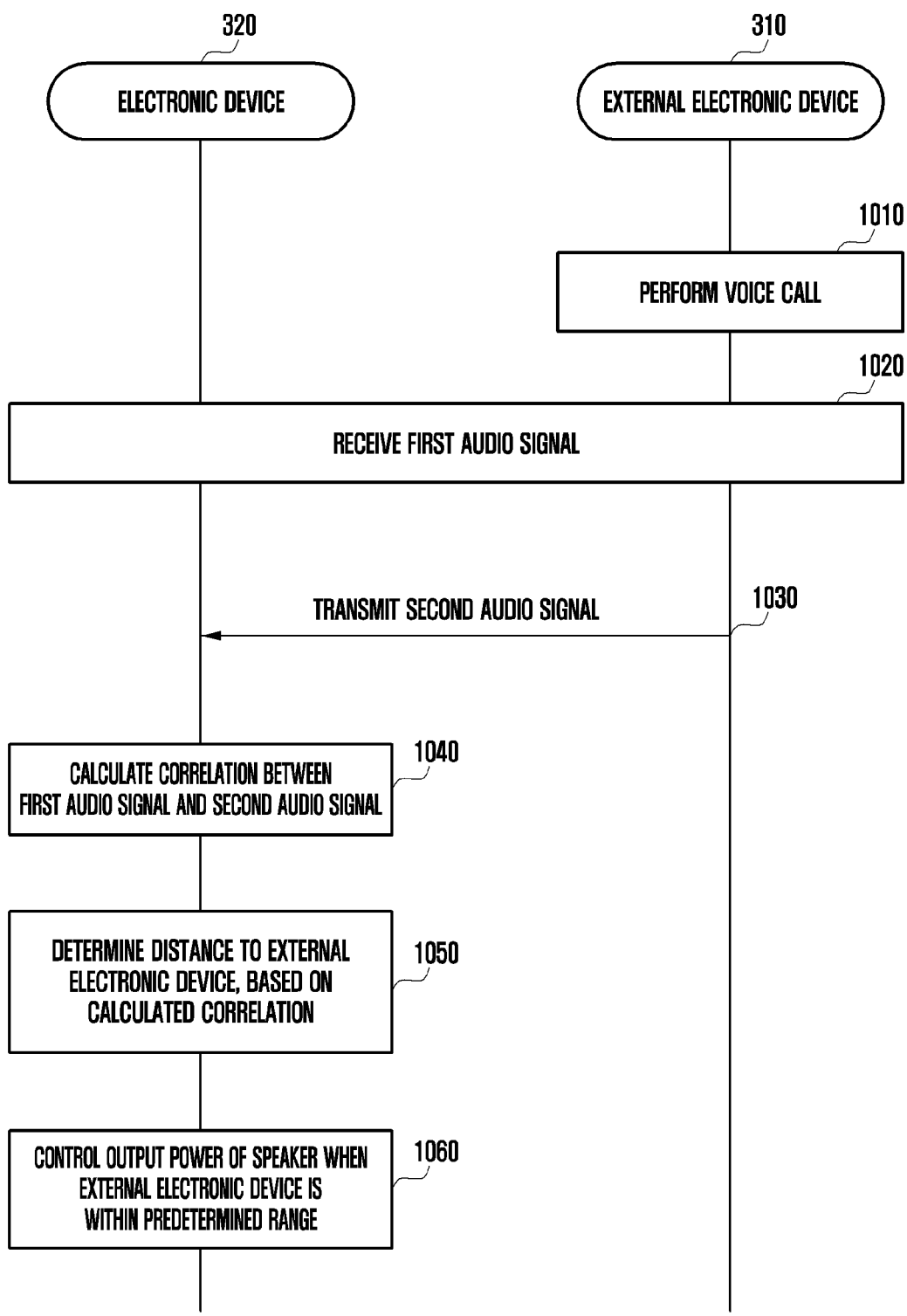
FIG. 10 illustrates an operation between an electronic device and an external electronic device according to various embodiments of the disclosure.

FIG. 10 illustrates an operation between an electronic device and an external electronic device according to various embodiments of the disclosure.

According to various embodiments, the processor 410 may receive a first audio signal through the microphone 450. The processor 410 may store the first audio signal received through the microphone 450 in the memory 440.

According to various embodiments, the processor 410 may make a call connection with the external electronic device through a communication circuit and may receive a second audio signal from the external electronic device.

According to various embodiments, the processor 410 may calculate correlation between the first audio signal and the second audio signal. The processor 410 may determine whether the external electronic device is located within a predetermined range from the electronic device on the basis of the calculated correlation. For example, when the calculated correlation is higher than or equal to a predetermined level, the processor 410 may determine that the external electronic device is within a predetermined distance from the electronic device. The correlation may refer to similarity between waveforms of two signals in a time domain and may be calculated using a correlation function.

Referring to FIG. 10, in operation 1010, the external electronic device 310 may initiate a voice call.

According to various embodiments, in operation 1020, a speaker' voice (audio signal) may be received by both the external electronic device 310 and the electronic device 320. The electronic device 320 may receive a first audio signal through the microphone 450.

According to various embodiments of the disclosure, in operation 1030, the external electronic device 310 may transmit the received voice to the electronic device 320 through the call service. The electronic device 320 may receive a second audio signal transmitted from the external electronic device 310 through the communication circuit 430.

According to various embodiments of the disclosure, in operation 1040, the processor 410 may calculate correlation between the first audio signal and the second audio signal received through the call connection.

According to various embodiments of the disclosure, in operation 1050, the processor 410 may determine a distance from the external electronic device 310 on the basis of the calculated correlation. For example, when the calculated correlation is higher than or equal to a predetermined reference, the processor 410 may determine that the external electronic device 310 is located within a predetermined range from the electronic device 320. In this case, the processor 410 may determine that howling can be generated.

According to various embodiments of the disclosure, in operation 1060, when it is determined that the external electronic device 310 is within the predetermined range from the electronic device 320, the processor 410 may control a volume of a voice tone output through the speaker 420 to be equal to or smaller than a predetermined reference. In this case, the processor 410 may control, for example, output power of the speaker 420 to reduce the volume of the voice tone output through the speaker 420 to be equal to or lower than about 10% of a preset volume or configure a mute state not to output the voice tone through the speaker 420. According to various embodiments, the processor 410 may apply a predetermined gain to the second audio signal received from the external electronic device through the communication circuit and configure a strength of the second audio signal output through the speaker 420 to be equal to or lower than a predetermined level or configure a mute state.

Figure 11:
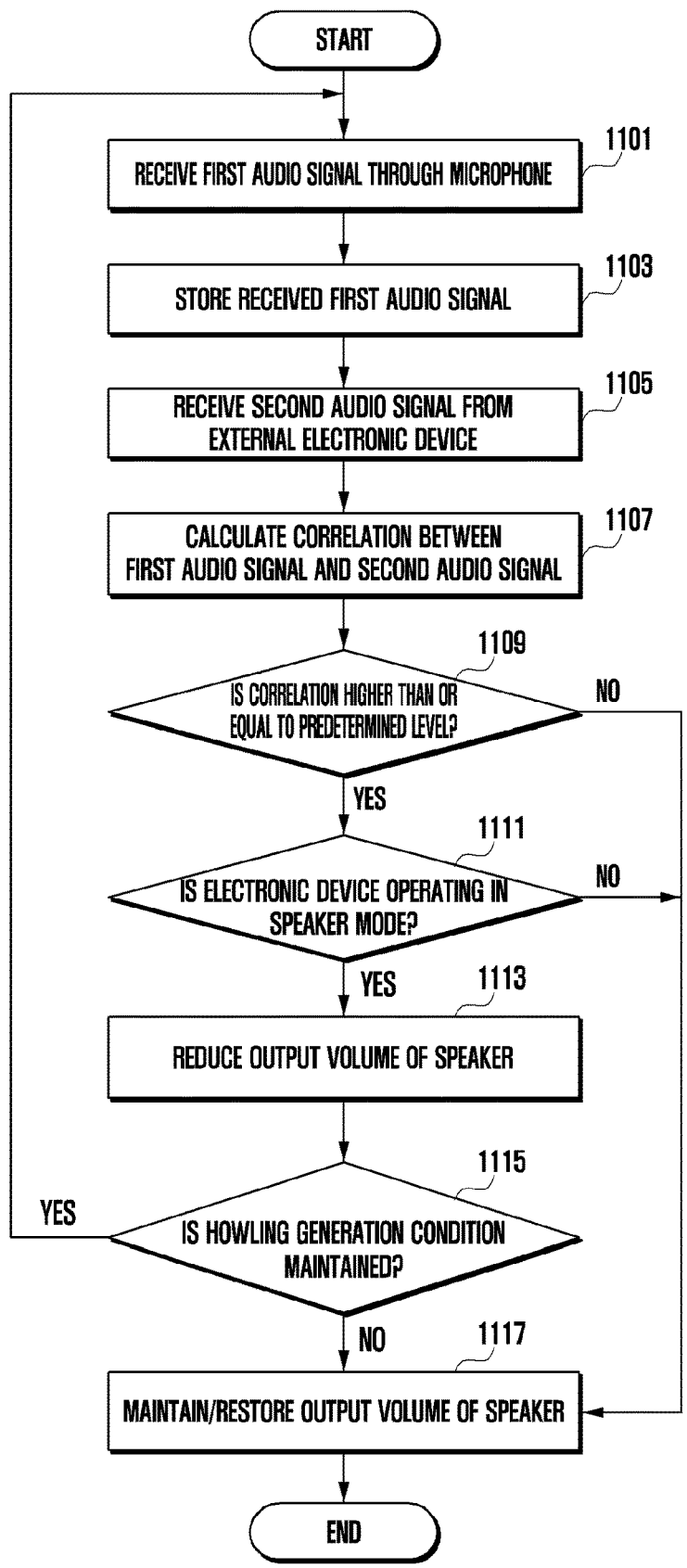
FIG. 11 is a flowchart illustrating a method of preventing the generation of howling of an electronic device according to various embodiments of the disclosure.

FIG. 11 is a flowchart illustrating a method of preventing the generation of howling of an electronic device according to various embodiments of the disclosure.

Referring to FIG. 11, in operation 1101, the processor 410 may receive a voice (first audio signal) from a speaker of an external electronic device through the microphone 450. The processor 410 may store the received first audio signal in the memory 440 in operation 1103.

According to various embodiments of the disclosure, in operation 1105, the processor 410 may receive a second audio signal from the external electronic device 310 through the communication circuit. The received second audio signal may be a signal corresponding to the voice signal from the speaker input into the external electronic device 310 and transmitted to the electronic device through the call service.

According to various embodiments of the disclosure, in operation 1107, the processor 410 may calculate correlation between the first audio signal and the second audio signal received through the call connection.

According to various embodiments of the disclosure, in operation 1109, the processor 410 may determine whether the calculated correlation is higher than or equal to a predetermined level. For example, when the calculated correlation is higher than or equal to the predetermined level, the processor 410 may determine that the external electronic device 310 is located within a predetermined distance from the electronic device 320. In this case, the processor 410 may determine that howling can be generated.

When the calculated correlation is lower than the predetermined level, the processor 410 may determine that howling is not generated by the external electronic device 310 and maintain a volume of a voice tone output through the speaker 420 in operation 1117.

When the calculated correlation is higher than or equal to the predetermined level, the processor 410 may determine whether the electronic device 320 is operating in the speaker mode in operation 1111.

When the electronic device 320 is not operating in the speaker mode and is operating in other modes, the processor 410 may determine that howling is not generated by the external electronic device 310 and maintain the volume of the voice tone output through the speaker 420 in operation 1117. Other modes, which are not the speaker mode, may include, for example, an earphone mode in which a voice tone is output through earphones and a Bluetooth mode in which a voice tone is output through a Bluetooth device connected through Bluetooth communication.

When the electronic device 320 is operating in the speaker mode (for example, when the electronic device 320, which is a portable terminal, is operating in the speakerphone mode), output power of the speaker 420 may be controlled in operation 1113. The processor 410 may control output power of the speaker 420 to reduce the volume of the voice tone output through the speaker 420 to a predetermined level or lower or process muting not to output the voice tone. According to various embodiments, the processor 410 may apply a predetermined gain to the second audio signal received from the external electronic device through the communication circuit to reduce the magnitude of the second audio signal output through the speaker 420 to be equal to or lower than a predetermined level or configure a mute state.

According to various embodiments of the disclosure, the processor 410 may determine that a howling generation condition is maintained in operation 1115. The case in which it is determined that the howling generation condition is not maintained and is changed may include, for example, the case in which the speaker mode is released (for example, the case in which a user input for releasing the speaker mode is received or switching to the earphone mode to output a sound through earphones is performed), the case in which a call with the external electronic device 310 ends, the case in which a call signal is not received from the external electronic device 310 for a predetermined time, and the case in which the external electronic device escapes a predetermined range.

According to various embodiments, the processor 410 may recalculate correlation between the first audio signal and the second audio signal in the state in which the speaker is configured to be mute. When the recalculated correlation is equal to or lower than the predetermined level, the processor 410 may determine that the distance between the electronic device 320 and the external electronic device 310 escapes the predetermined range. In this case, the processor may determine that the howling generation condition is not maintained and is changed.

When it is determined that the howling generation condition is maintained, the processor may proceed to operation 1101 and receive a new audio signal through the microphone.

When it is determined that the howling generation condition is not maintained and is changed, the processor 410 may proceed to operation 1117 and restore the volume of the voice tone output through the speaker 420 as original. The processor 410 may release the mute state of the speaker or reconfigure the output power of the speaker as a default setting value or output power before the output power is reduced.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. The electronic device according to embodiments of the disclosure is not limited to those described above.

It should be appreciated that various embodiments of the disclosure and the terms used therein are not intended to limit the technological features set forth herein to particular embodiments and include various changes, equivalents, and/or alternatives for a corresponding embodiment. With regard to the description of the drawings, similar reference numerals may be used to designate similar or relevant elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "a first", "a second", "the first", and "the second" may be used to simply distinguish a corresponding element from another, and does not limit the elements in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may be interchangeably used with other terms, for example, "logic," "logic block," "component," or "circuit". The "module" may be a minimum unit of a single integrated component adapted to perform one or more functions, or a part thereof. For example, according to an embodiment, the "module" may be implemented in the form of an application-specific integrated circuit (ASIC).

Various embodiments as set forth herein may be implemented as software (e.g., the program 140) including one or more instructions that are stored in a storage medium (e.g., the internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each element (e.g., a module or a program) of the above-described elements may include a single entity or multiple entities. According to various embodiments, one or more of the above-described elements may be omitted, or one or more other elements may be added. Alternatively or additionally, a plurality of elements (e.g., modules or programs) may be integrated into a single element. In such a case, according to various embodiments, the integrated element may still perform one or more functions of each of the plurality of elements in the same or similar manner as they are performed by a corresponding one of the plurality of elements before the integration. According to various embodiments, operations performed by the module, the program, or another element may be carried out sequentially, in parallel, repeatedly, or heuristically, or one or more of the operations may be executed in a different order or omitted, or one or more other operations may be added.

The invention claimed is:

1. An electronic device comprising:
a speaker;
a short-range communication circuit;
a cellular communication circuit;
a processor; and
memory storing instructions that, when executed by the processor, cause the electronic device to:
receive a broadcasting signal by periodically scanning a preset frequency bandwidth from an external electronic device through the short-range communication circuit,
determine a distance to the external electronic device, based on the received broadcasting signal, and
receive an audio signal through the cellular communication circuit, and
control output power of the speaker for outputting the audio signal to be a predetermined strength, based on the distance being within a predetermined range.

2. The electronic device of claim 1, wherein the instructions cause the electronic device to, when executed, configure the speaker to be in a mute state as at least a portion of an operation for controlling the output power of the speaker to be the predetermined strength.

3. The electronic device of claim 1, wherein the instructions cause the electronic device to, when executed, determine that the distance is within the predetermined range when the strength of the received broadcasting signal is higher than or equal to a preset threshold value.

4. The electronic device of claim 1, wherein the instructions cause the electronic device to, when executed, activate the short-range communication circuit in response to initiation of a call of the electronic device in a speaker mode.

5. The electronic device of claim 2, wherein the instructions cause the electronic device to, when executed, release the mute state of the speaker when it is determined that the external electronic device escapes the predetermined range, based on the strength of the received broadcasting signal in a state in which the speaker is configured to be in the mute state.

6. The electronic device of claim 1,
wherein the instructions cause the electronic device to, when executed,
receive a third audio signal output through a speaker of an external electronic device through a microphone, determine a distance to the external electronic device, based on the received third audio signal, and control output power of the speaker for outputting an audio signal received from the external electronic device to be a predetermined strength through the cellular communication circuit, based on the distance being within a predetermined range.

7. The electronic device of claim 6, wherein the instructions cause the electronic device to, when executed, configure the speaker to be in a mute state as at least a portion of an operation for controlling a strength of an audio signal output through the speaker to be a predetermined strength.

8. The electronic device of claim 6, wherein the instructions cause the electronic device to, when executed, determine that the distance is within the predetermined range when the strength of the third audio signal is higher than or equal to a preset threshold value.

9. The electronic device of claim 7, wherein the instructions cause the electronic device to, when executed, periodically identify whether the third audio signal output through the speaker of the external electronic device is received through the microphone.

10. The electronic device of claim 9, wherein the instructions cause the electronic device to, when executed, release the mute state when it is determined that the external electronic device escapes the predetermined range, based on the strength of the third audio signal received in a state in which the speaker is configured to be in the mute state.

11. The electronic device of claim 1,
wherein the instructions cause the electronic device to, when executed,
receive a fourth audio signal through a microphone, receive a fifth audio signal from an external electronic device through the cellular communication circuit, calculate correlation between the fourth audio signal and the fifth audio signal, determine a distance to the external electronic device, based on the correlation, and control output power of the speaker for outputting the fifth audio signal to be a predetermined strength, based on the distance being within a predetermined range.

12. The electronic device of claim 11, wherein the instructions cause the electronic device to, when executed, configure the speaker to be in a mute state as at least a portion of an operation for controlling the output power of the speaker to be the predetermined strength.

13. The electronic device of claim 12, wherein the instructions cause the electronic device to, when executed, calculate the correlation by comparing a waveform of the fourth audio signal with a waveform of the fifth audio signal.

14. The electronic device of claim 12, wherein the instructions cause the electronic device to, when executed, release the mute state of the speaker when the fifth audio signal is not received for a predetermined time through the cellular communication circuit in a state in which the speaker is configured to be in the mute state.

15. The electronic device of claim 12, wherein the instructions cause the electronic device to, when executed, recalculate correlation between the fourth audio signal and the fifth audio signal in a state in which the speaker is configured to be in the mute state and release the mute state of the speaker when it is determined that the distance escapes the predetermined range, based on the recalculated correlation.

\* \* \* \* \*